United States Patent
Vishne et al.

(10) Patent No.: US 11,507,309 B2
(45) Date of Patent: Nov. 22, 2022

(54) STORAGE SYSTEM AND METHOD FOR USING MEMORY ALLOCATED IN A HOST FOR READ DATA AS A HOST MEMORY BUFFER

(71) Applicant: Western Digital Technologies, Inc., San Jose, CA (US)

(72) Inventors: Gadi Vishne, Petach Tikva (IL); Israel Yehiel Zimmerman, Ashdod (IL); Mor Brosh, Kedumim (IL); David Haliva, Kfar Sava (IL); Eli Ben-Gigi, Petach Tikva (IL)

(73) Assignee: Western Digital Technologies, Inc., San Jose, CA (US)

( * ) Notice: Subject to any disclaimer, the term of this patent is extended or adjusted under 35 U.S.C. 154(b) by 84 days.

(21) Appl. No.: 16/866,070

(22) Filed: May 4, 2020

(65) Prior Publication Data
US 2021/0342096 A1    Nov. 4, 2021

(51) Int. Cl.
*G06F 3/06*     (2006.01)
*G06F 11/10*    (2006.01)

(52) U.S. Cl.
CPC .......... *G06F 3/0659* (2013.01); *G06F 3/0604* (2013.01); *G06F 3/0656* (2013.01); *G06F 3/0673* (2013.01); *G06F 11/1076* (2013.01)

(58) Field of Classification Search
CPC .... G06F 3/0659; G06F 3/0604; G06F 3/0656; G06F 3/0673; G06F 11/1076
See application file for complete search history.

(56) References Cited

U.S. PATENT DOCUMENTS

| | | | |
|---|---|---|---|
| 7,562,168 B1 * | 7/2009 | Yifrach | H04L 49/90 710/52 |
| 9,170,939 B1 * | 10/2015 | Jones | G11C 7/10 |
| 9,507,722 B2 | 11/2016 | Desai et al. | |
| 10,007,433 B2 | 6/2018 | Hahn | |
| 10,055,164 B2 | 8/2018 | Benisty et al. | |
| 10,268,584 B2 | 4/2019 | Hahn | |
| 10,642,496 B2 * | 5/2020 | Benisty | G06F 3/0685 |
| 2012/0246392 A1 | 9/2012 | Cheon | |

(Continued)

FOREIGN PATENT DOCUMENTS

WO    WO 2017/074563 A1    5/2017

OTHER PUBLICATIONS

K. Kim, E. Lee and T. Kim, "HMB-SSD: Framework for Efficient Exploiting of the Host Memory Buffer in the NVMe SSD," in IEEE Access, vol. 7, pp. 150403-150411. (Year: 2019).*

(Continued)

*Primary Examiner* — Ramon A. Mercado
(74) *Attorney, Agent, or Firm* — Crowell & Moring LLP (57) ABSTRACT

A storage system and method for using memory allocated in a host for read data as a host memory buffer are provided. In one embodiment, a controller of a storage system receives a read request from a host for data stored in the memory, wherein the read request identifies a storage location in the host that is allocated by the host to store the requested data after it is received from the storage system. Prior to sending the requested data to the host, the storage system uses the allocated storage location in the host as a host memory buffer to store other data until the host needs the allocated storage location to store the requested data. Other embodiments are provided.

16 Claims, 6 Drawing Sheets

(56) References Cited

U.S. PATENT DOCUMENTS

| | | | |
|---|---|---|---|
| 2016/0210045 | A1 | 7/2016 | Hahn et al. |
| 2016/0246726 | A1* | 8/2016 | Hahn .................... G06F 3/0613 |
| 2016/0274797 | A1 | 9/2016 | Hahn |
| 2017/0123991 | A1* | 5/2017 | Sela .................... G06F 12/0246 |
| 2017/0206030 | A1* | 7/2017 | Woo ........................ G06F 3/062 |
| 2017/0285940 | A1* | 10/2017 | Benisty .................. G06F 3/067 |
| 2017/0351452 | A1* | 12/2017 | Boyd .................... G06F 3/0611 |
| 2018/0018101 | A1 | 1/2018 | Benisty et al. |
| 2018/0107614 | A1* | 4/2018 | Hong .................... G06F 12/063 |
| 2018/0150390 | A1 | 5/2018 | Chien et al. |
| 2018/0260347 | A1* | 9/2018 | Benisty ................. G06F 3/0688 |
| 2020/0098423 | A1 | 3/2020 | Huang et al. |

OTHER PUBLICATIONS

"Host memory allocation with CL_MEM_ALLOC_HOST_PTR," Khronos Forum; downloaded from the Internet at https://community.khronos.org/t/host-memory-allocation-with-cl-mem-alloc-host-ptr/4777 on Mar. 4, 2020; two pages; Mar. 2014.

"StorPortAllocateHostMemoryBuffer function," Microsoft Windows drivers article; downloaded from the Internet at https://docs.microsoft.com/en-us/windows-hardware/drivers/ddi/storport/nf-storport-storport on Mar. 4, 2020; four pages; Mar. 29, 2018.

International Search Report completed May 10, 2021 for International Application No. PCT/US2021/016057.

Written Opinion completed May 10, 2021 for International Application No. PCT/US2021/016057.

Israel Patent Office Search Strategy completed May 10, 2021 for International Application No. PCT/US2021/016057.

\* cited by examiner

STORAGE SYSTEM AND METHOD FOR USING MEMORY ALLOCATED IN A HOST FOR READ DATA AS A HOST MEMORY BUFFER

BACKGROUND

A host can send read and write requests to a storage system to read data from and store data in a memory of the storage system. Some storage systems can request the use of a memory in the host.

DETAILED DESCRIPTION

Overview

By way of introduction, the below embodiments relate to a storage system and method for using memory allocated in a host for read data as a host memory buffer. In one embodiment, a storage system is provided comprising a memory and a controller. The controller is configured to: receive a read request from a host for data stored in the memory, wherein the read request identifies a storage location in the host that is allocated by the host to store the requested data after it is received from the storage system; and prior to sending the requested data to the host, store other data in the storage location in the host.

In some embodiments, the storage location in the host is available for use by the storage system without the storage system requesting such use from the host.

In some embodiments, the read request identifies a location and size of the storage location in the host.

In some embodiments, the controller is configured to store the other data in the storage location in the host in parallel with handling the read request.

In some embodiments, the other data comprises data to be written in the memory.

In some embodiments, the other data comprises data for a read error handling operation.

In some embodiments, the other data comprises a mapping table.

In some embodiments, the other data comprises data used in an error correction mechanism.

In some embodiments, the other data is moved from the storage location in the host to another storage location before the requested data is received by the host and stored in the storage location.

In some embodiments, the other data is overwritten when the requested data is received by the host and stored in the storage location.

In some embodiments, the memory comprises a three-dimensional memory.

In another embodiment, a method is provided that is performed in a storage system comprising a memory. The method comprises receiving a read command from a host requesting data stored in the memory; handling the read command; while handling the read command but prior to transferring the data to the host, using a buffer allocated in the host for the data as a host memory buffer to store other data; and transferring the data to the host.

In some embodiments, the other data comprises data to be written in the memory.

In some embodiments, the other data comprises data for a read error handling operation.

In some embodiments, the other data comprises a mapping table.

In some embodiments, the other data comprises data used in an error correction mechanism.

In some embodiments, the other data is moved from the storage location in the host to another storage location before the requested data is received by the host and stored in the storage location.

In some embodiments, the other data is overwritten when the requested data is received by the host and stored in the storage location.

In another embodiment, a storage system is provided comprising a memory; means for receiving a read command from a host requesting data stored in the memory; and means for prior to sending the requested data to the host, storing other data in a storage location in the host allocated for the requested data.

Other embodiments are possible, and each of the embodiments can be used alone or together in combination. Accordingly, various embodiments will now be described with reference to the attached drawings.

Embodiments

Figures 1A, 1B:
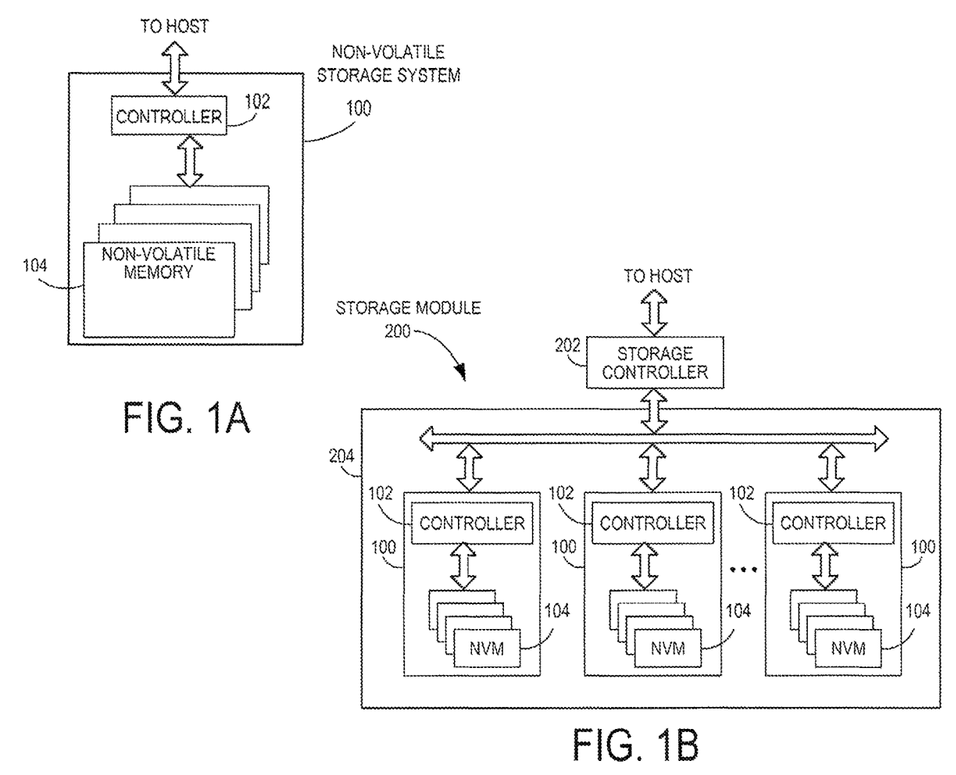
FIG. 1A is a block diagram of a non-volatile storage system of an embodiment.
FIG. 1B is a block diagram illustrating a storage module of an embodiment.
Figure 1C:
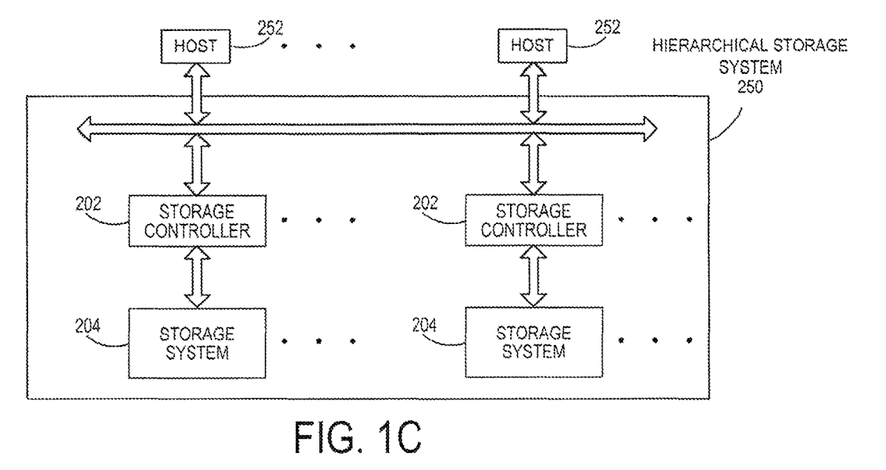
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAIVI), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
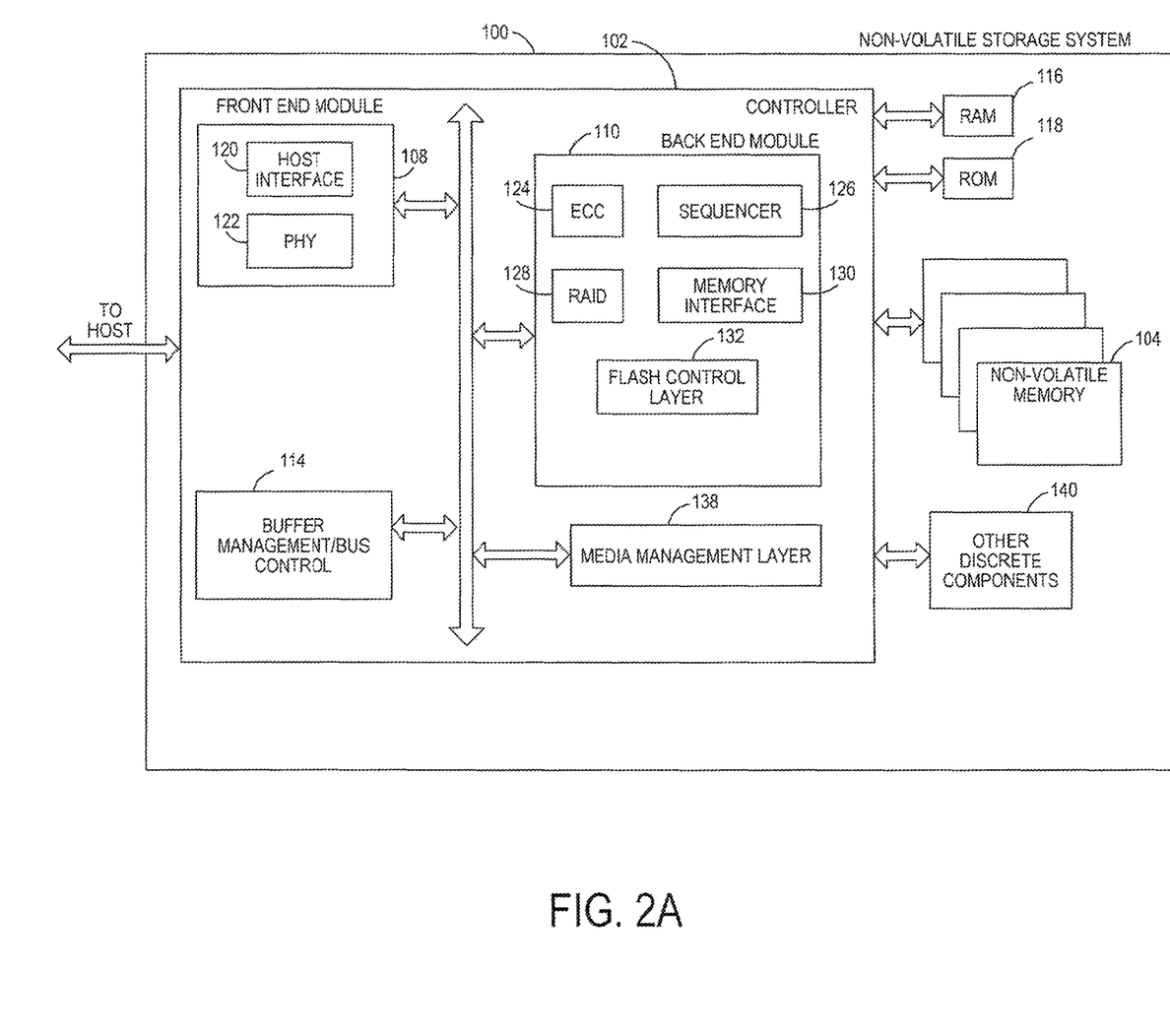
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
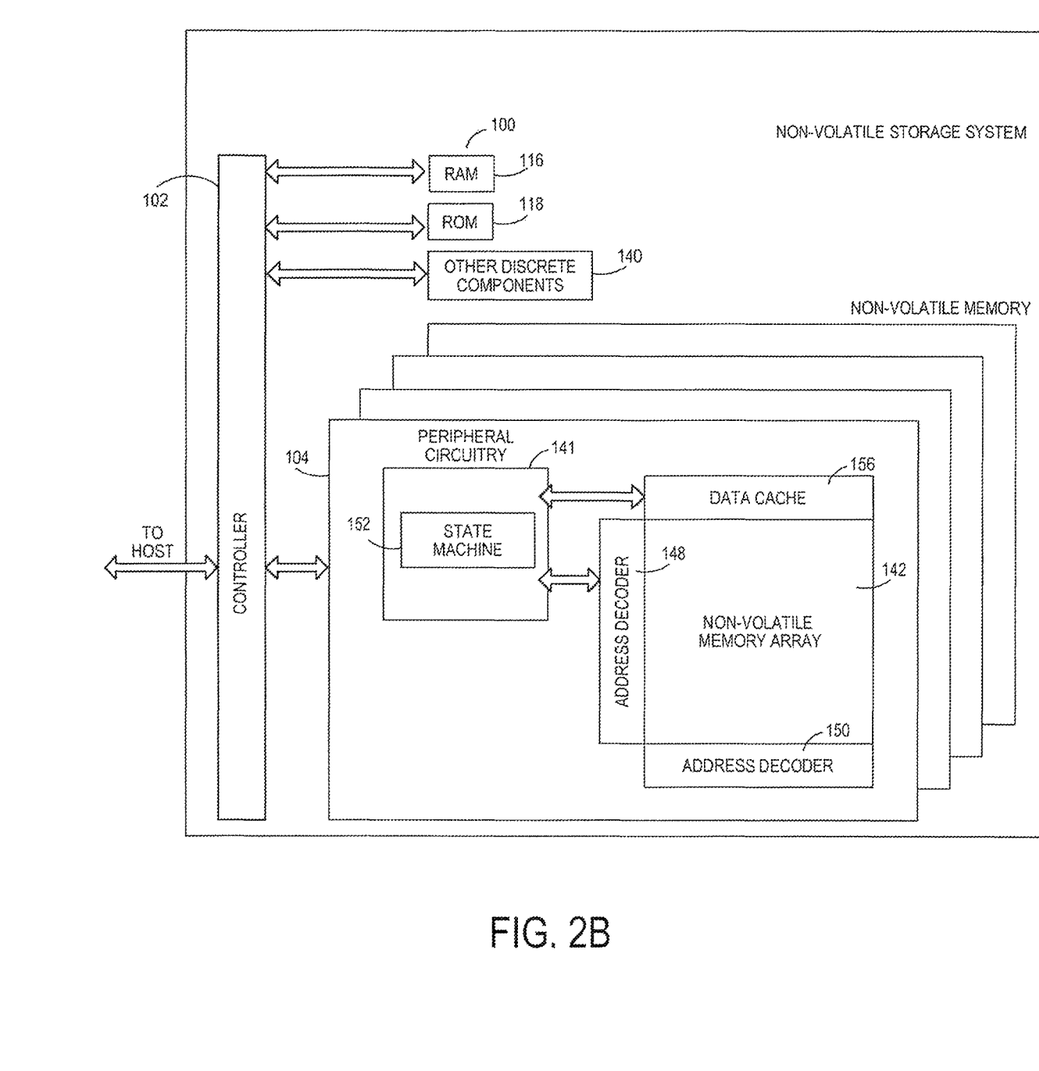
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
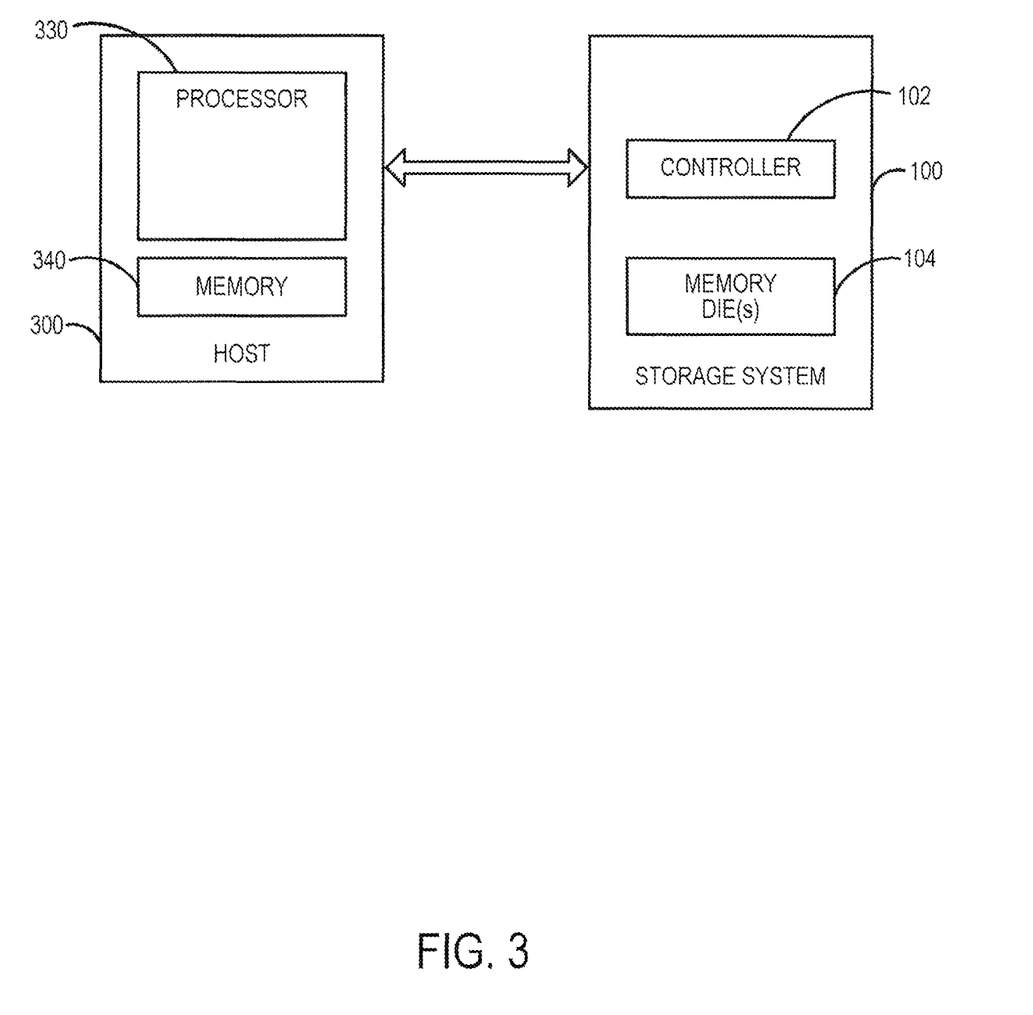
FIG. 3 is a block diagram of a host and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 (e.g., a computing device) in this embodiment comprises a processor 330 and a memory 340.

In some situations, the volatile memory (e.g., RAM 116) in the storage system 100 can be used as a cache for data otherwise stored in the non-volatile memory 104 (e.g., logical-to-physical address mapping tables) and/or for temporary data (e.g., data used in an error handling or correction process, write data to be stored in the non-volatile memory 104, etc.). However, as that amount of storage in the volatile memory 116 is limited, it is possible to run out of space in the volatile memory 116, which can adversely affect the performance of the storage system 100. In one embodiment, the storage system 100 uses the memory 340 in the host 300 as an extension of the volatile memory 116 in the storage system 100. When the memory 340 in the host 300 is used for such a purpose, it can be referred to as a "host memory buffer (HMB)."

Figure 4:
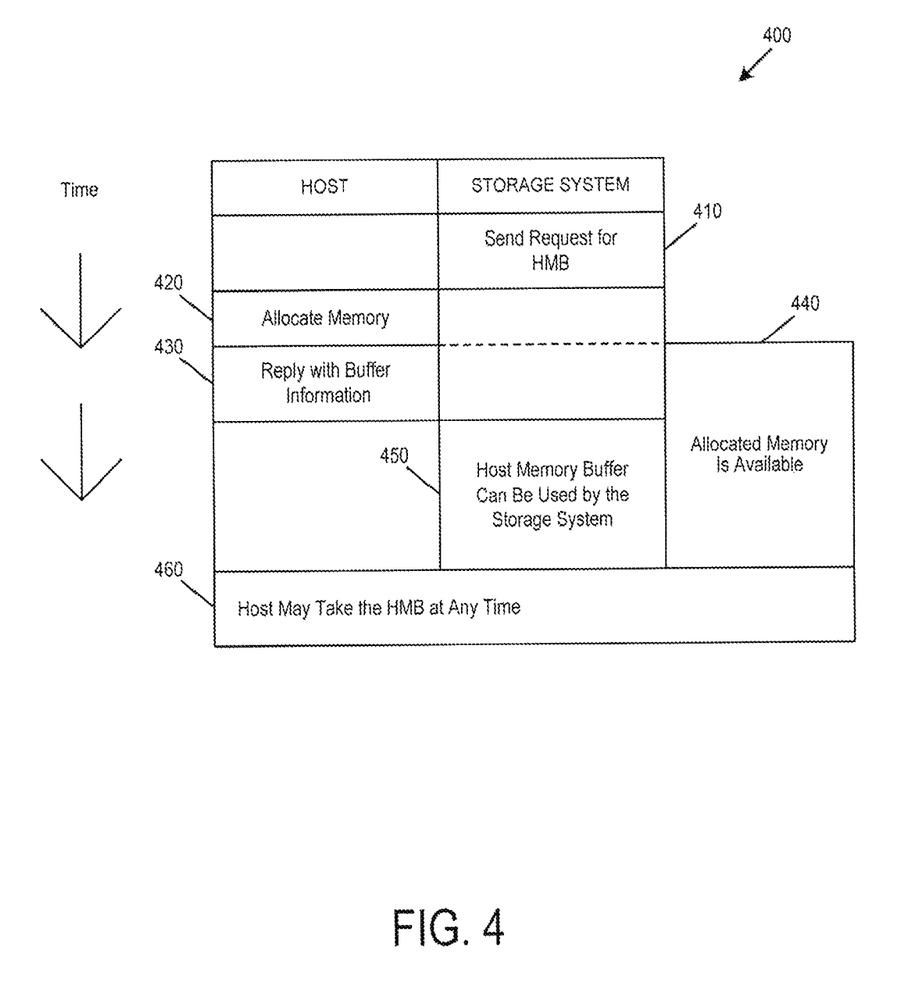
FIG. 4 is a diagram illustrating a process of an embodiment for allocating a host memory buffer.

FIG. 4 is an illustration of how the host memory buffer can be established in one embodiment. As shown in FIG. 4, the storage system 100 sends a request to the host 300 for the HMB (act 410). In response to the request, the host 300 allocates a storage location in its memory 340 for the HMB (act 420) and replies to the storage system's request with the buffer information (e.g., the location and size of the allocated storage location) (act 430). The allocated memory is made available to the storage system 100 (act 440), and the HMB can be used by the storage system 100 (act 450). However, the host may take the HMB away from the storage system 100 at any time (act 460).

Figure 5:
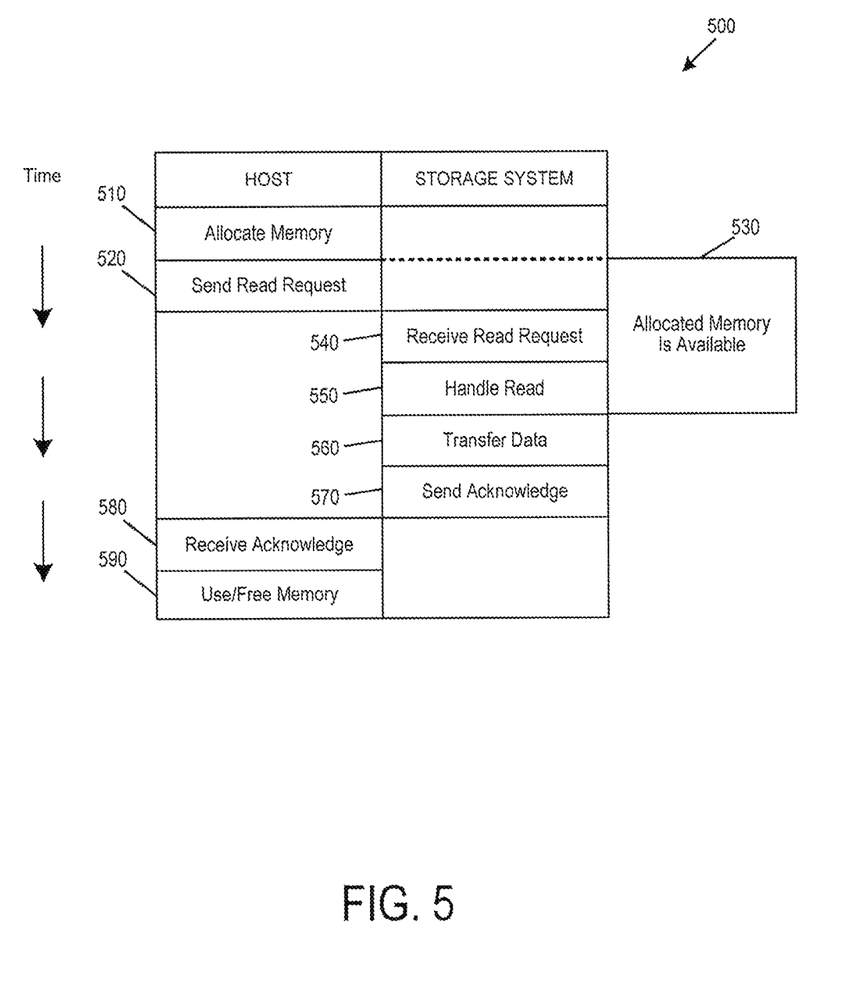
FIG. 5 is a diagram illustrating a process of an embodiment for using memory allocated in a host for read data as a host memory buffer.

In another embodiment, instead of or in addition to requesting the use of the HMB, the storage system 100 takes advantage of allocated host memory that is being unused and uses that at the HMB without request it from the host 300. This embodiment is illustrated in the diagram 500 in FIG. 5. As shown in FIG. 5, prior to the host 300 sending a read request to the storage system 100 to read data stored in the storage system's memory 104, the host 300 allocates a portion of its memory 340 to store the requested data after it is received from the storage system 100 (act 510). The host 300 then sends the read request to the storage system 100 (act 530). The request can identify the allocated storage location to the storage system 100. For example, the request can include the location of the allocated storage location (e.g., address, offset) and the size of the storage location. With that information, the storage system 100 knows how much space is allocated and where that space is located.

Typically, the allocated space in the host memory 340 would remain vacant until the storage system 100 fills the space with the data that the host 300 requested be read and returned to it. However, this embodiment recognizes that, until the requested data is sent to the host 300, the allocated memory is empty and available for use (act 530). After the storage system 100 receives the read request (act 540), it understands where the allocated memory is in the host 300. So, in parallel with handling the read command (e.g., during the process of reading the data from memory 104 and/or the process of processing (e.g., error correcting) the data) (act 550), the storage system 100 can use the allocated memory as a host memory buffer, storing in it other data until the host 300 needs the allocated storage location to store the requested data. Unlike the embodiment shown in FIG. 4, in this embodiment, the storage system 100 uses the allocated space in the host memory 340 without first requesting or asking permission for the use of such space. After the requested data is sent to the host 300 (act 560), the storage system 100 can send an acknowledgement to the host 300 (act 570). In response to receiving the acknowledgement (act 580), the host 300 uses the allocated storage location for another purpose or keeps it as free memory (act 590).

The storage system 100 can store any desired data in the "unrequested HMB." For example, the other data can comprise data to be written in the memory to improve write acknowledge time. Typically, the storage system 100 sends an acknowledgment to the host 200 after receiving a write command and buffering the write data in the storage system's volatile memory 116 prior to committing it to the non-volatile memory 104. When there is not enough space immediately available in the volatile memory 116 to do that, acknowledgment of the write command is delayed. The unrequested HMB can be used to store such data, thereby avoiding the delay in the acknowledgment of the write command. The data can later be read out of the unrequested HMB and into the storage system's volatile memory 116 when space is available there. As another example, the other data can comprise data for a read error handling operation (e.g., temporary data, such as a soft bit or an exclusive-or (XOR) bit) or temporary data used in an error correction mechanism (e.g., temporary data generated in a low-density parity-check code (LDPC) mechanism). As yet another example, the other data can be part or all of a logical-to-physical address mapping table that would otherwise be stored in the storage system's volatile memory 116. That is, in some cases during a read operation, the flash translation layer (FTL) reads mapping tables into a temporary buffer that is not going to be used later. It is possible to put these tables in the host memory 340 and overwrite it with the requested data.

It should be noted that the other data that is stored in the unrequested HMB can be moved to another location (e.g., in the host 300 or in the storage system 100) when the allocated storage location in host memory 340 is needed to store the requested read data. Alternatively, if the other data is temporary data, that data can just be overwritten with the requested read data. Further, as the host 300 sends additional read requests to the storage system 100, the storage system 100 can use the additional unrequested HMBs created by those rolling series of requests.

As can be seen from the above examples, there are many advantages associated with these embodiments. Among them, these embodiment can be used to reduce the size of volatile memory needed in the storage system 100 and can improve performance in some workloads. Other advantages can be gained using these embodiments to take advantage of allocated but unused storage locations in the host (as communicated to the storage system 100 through a bus).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
    a memory; and
    a controller configured to:
        receive a read request from a host for data stored in the memory, wherein the read request identifies a storage location in the host that is specifically allocated by the host to store the requested data after it is received from the storage system; and
        prior to sending the requested data to the host:
            use the storage location in the host as an unrequested host memory buffer to store other data in the storage location in the host while the storage location is empty awaiting the requested-data and is available for use; and
            store the other data from the storage location in a different storage location prior to the other data being overwritten by the requested data.

2. The storage system of claim 1, wherein the read request identifies a location and a size of the storage location in the host.

3. The storage system of claim 1, wherein the controller is further configured to store the other data in the storage location in the host in parallel with handling the read request.

4. The storage system of claim 1, wherein the other data comprises data to be written in the memory.

5. The storage system of claim 1, wherein the other data comprises data for a read error handling operation.

6. The storage system of claim 1, wherein the other data comprises a mapping table.

7. The storage system of claim 1, wherein the other data comprises data used in an error correction mechanism.

8. The storage system of claim 1, wherein the memory comprises a three-dimensional memory.

9. A method comprising:
    performing the following in a storage system comprising a memory:
        receiving a read request from a host for data stored in the memory; wherein the read request identifies a storage location in the host that is specifically allocated by the host to store the requested data after it is received from the storage system, and
        prior to sending the requested data to the host:
            using the storage location in the host as an unrequested host memory buffer to store other data in the storage location in the host while the storage location is empty awaiting the requested data and is available for use; and
            storing the other data from the storage location in a different storage location prior to the other data being overwritten by the requested data.

10. The method of claim 9, wherein the other data comprises data to be written in the memory.

11. The method of claim 9, wherein the other data comprises data for a read error handling operation.

12. The method of claim 9, wherein the other data comprises a mapping table.

13. The method of claim 9, wherein the other data comprises data used in an error correction mechanism.

14. A storage system comprising:
    a memory;
    means for receiving a read request from a host for data stored in the memory, wherein the read request identifies a storage location in the host that is specifically allocated by the host to store the requested data after it is received from the storage system;
    means for using the storage location in the host as an unrequested host memory buffer to store other data in the storage location in the host while the storage location is empty awaiting the requested-data and is available for use; and
    means for storing the other data from the storage location in a different storage location prior to the other data being overwritten by the requested data.

15. The method of claim 9, wherein the other data is stored in the storage location in the host in parallel with handling the read command.

16. The method of claim 9, wherein the memory comprises a three-dimensional memory.

\* \* \* \* \*